United States Patent
Cowen et al.

(10) Patent No.: US 8,548,798 B2
(45) Date of Patent: Oct. 1, 2013

(54) REPRESENTATIONS FOR GRAPHICAL USER INTERFACES OF OPERATORS, DATA TYPES, AND DATA VALUES IN A PLURALITY OF NATURAL LANGUAGES

(75) Inventors: Laura J. Cowen, Hursley (GB); Doina L. Klinger, Hursley (GB); James S. Taylor, Hursley (GB); Xiaoming Zhang, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 350 days.

(21) Appl. No.: 12/981,687

(22) Filed: Dec. 30, 2010

(65) Prior Publication Data

US 2011/0213609 A1 Sep. 1, 2011

(30) Foreign Application Priority Data

Feb. 26, 2010 (EP) .................... 10154830

(51) Int. Cl.
*G06F 17/28* (2006.01)
(52) U.S. Cl.
USPC ............ 704/8; 704/2; 704/277; 715/264; 715/267
(58) Field of Classification Search
USPC ............ 704/2, 3, 8, 277; 715/264, 265, 715/267
See application file for complete search history.

(56) References Cited

U.S. PATENT DOCUMENTS

| | | | |
|---|---|---|---|
| 5,842,204 A * | 11/1998 | Andrews et al. ............. 341/79 |
| 6,513,002 B1 * | 1/2003 | Gillam ............................ 704/9 |
| 6,934,910 B2 * | 8/2005 | Lange ............................ 715/267 |
| 7,036,106 B1 * | 4/2006 | Wang et al. .................. 716/104 |
| 7,171,352 B2 * | 1/2007 | Chang et al. .................... 704/9 |
| 7,506,255 B1 * | 3/2009 | Feinberg et al. ............. 715/264 |
| 7,681,186 B2 * | 3/2010 | Chang et al. ................. 717/143 |
| 7,689,410 B2 * | 3/2010 | Chang et al. ..................... 704/9 |
| 7,761,858 B2 * | 7/2010 | Chang et al. ................. 717/140 |
| 7,783,637 B2 * | 8/2010 | Bitsch et al. ................. 707/736 |
| 8,201,139 B2 * | 6/2012 | Chang et al. ................. 717/104 |
| 8,244,520 B2 * | 8/2012 | Ashworth et al. ............. 704/8 |
| 2005/0251382 A1 * | 11/2005 | Chang et al. ..................... 704/9 |
| 2005/0273335 A1 * | 12/2005 | Chang et al. ................. 704/257 |
| 2005/0273336 A1 * | 12/2005 | Chang et al. ................. 704/257 |
| 2006/0129932 A1 * | 6/2006 | Weber et al. ................. 715/705 |
| 2007/0180373 A1 * | 8/2007 | Bauman et al. .............. 715/535 |
| 2008/0059877 A1 * | 3/2008 | Brookler et al. ............. 715/264 |
| 2008/0115056 A1 * | 5/2008 | Escapa et al. ................ 715/267 |
| 2009/0112575 A1 * | 4/2009 | Sakashita et al. .............. 704/8 |
| 2009/0112787 A1 * | 4/2009 | Ginzberg ...................... 706/47 |

FOREIGN PATENT DOCUMENTS

EP 1589440 A2 10/2005

* cited by examiner

*Primary Examiner* — Martin Lerner
(74) *Attorney, Agent, or Firm* — A. Bruce Clay

(57) ABSTRACT

A natural language-independent computer program is constructed. A data element is defined by a graphical representation in a user interface. A data element has a data type and a value. An operator is defined on multiple data elements by association of the graphical representations in the user interface. A natural language-independent graph data structure is defined by the association of data elements representing the logic of a computer program. The data types and operators have referenced descriptions in one or more natural languages, enabling a logical expression such as a computer program to be defined and understood in one or more natural languages.

18 Claims, 8 Drawing Sheets

REPRESENTATIONS FOR GRAPHICAL USER INTERFACES OF OPERATORS, DATA TYPES, AND DATA VALUES IN A PLURALITY OF NATURAL LANGUAGES

CROSS-REFERENCE TO RELATED APPLICATIONS

The present application claims a priority filing date of Feb. 26, 2010 from EP Application Number 10154830.3 filed by the same assignee herein, which is incorporated herein in its entirety by reference.

BACKGROUND

This invention relates to the field of program construction, and in particular, to language-independent program construction.

Computer programming generally demands high technical proficiency. This is one of the major hurdles that prevent information technology from being accessed by the wider public. To non-technical people, the best language for programming a computer is natural language in a user's native language. However, natural language descriptions are frequently ambiguous and not good candidates for programming purposes.

In addition, users from different cultures describe things differently in their different languages, for example, the order of terms in a phrase. Differences in phrasing order can also prohibit a program composed in one national language from being shared by a speaker of another national language unless the program is translated.

An example of the language problem of users is a description of the arithmetic operation "a+b." In English, this can be expressed as "the summation of {a} and {b}." The order of appearance of the parameters in different natural languages can be quite different. For example, the above description represents a conceptual parameter order of {+}, {d1}, {d2}. However, a translation of the above description in Chinese has an ordering of {d1}, {d2}, {+}. This difference can potentially affect the way a user builds a program in terms of ordering of operators and parameters.

BRIEF SUMMARY

According to an embodiment of the present invention there is provided a method for natural language-independent program construction. A data element is defined by a graphical representation in a user interface, wherein a data element has a data type and a value. An operator is defined to perform defined functions on at least one data element by association of the graphical representations in the user interface. The data types and operators have descriptions referenced in a natural language. A natural language-independent computer program is defined by using appropriate natural language reference descriptions of a data type and an operator.

According to an embodiment of the present invention there is provided a system for natural language-independent program construction. A data element having a data type and a value is defined by a graphical representation. An operator is defined to perform defined functions on at least one data element by association of the graphical representation. The data type and the operator have reference descriptions in a natural language. A natural language-independent computer program is defined by using appropriate natural language reference descriptions of a data type and an operator.

According to an embodiment of the present invention there is provided a computer program product for natural language-independent program construction. A data element having a data type and a value is defined by a graphical representation in a user interface. An operator is defined to perform defined functions on at least one data element by association of the graphical representation. The data type and the operator have reference descriptions in a natural language. A natural language-independent computer program is defined by using appropriate natural language reference descriptions of a data type and an operator.

DETAILED DESCRIPTION

Figure 1:
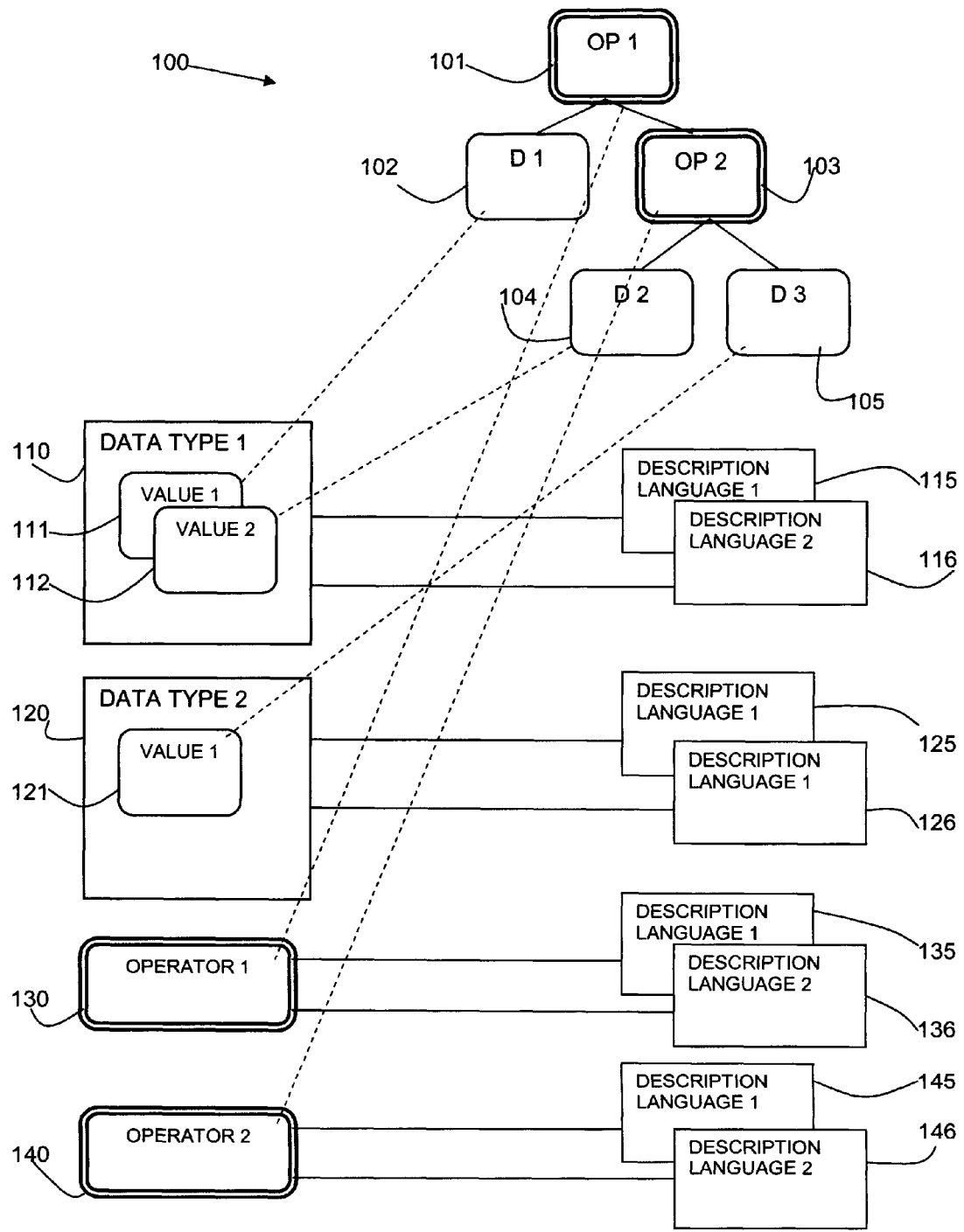
FIG. 1 is a schematic diagram of a data structure in accordance with an embodiment of the present invention.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

An embodiment of the present invention allows non-technical users to construct computer programs expressed in data elements and operators while building up an internal image of the program. The program image formed of data elements and operators is natural language-independent with descriptions of the data elements and operators available in multiple natural languages. A resultant program can be converted between different natural languages using the descriptions of the data elements and operators. The user experience is as if he/she is expressing their intention using a natural language but with the guidance of the user interface so that a description has accurate semantics.

A computer program is considered as a logical expression of a set of operator instructions applied to a set of data or results of previous operations. Internal to a computer, such a set of instructions can be expressed as a set of semantic graphs.

For example, a program achieving the logical expression op1(d1, op2(d2, d3)) can be expressed as the graph data structure, in this example as a tree data structure 100 shown in FIG. 1. In FIG. 1, the tree has a root node 101 of "op1" with branch nodes 102, 103 of "d1" and "op2". The branch node 103 of "op2" has leaf nodes 104, 105 of "d2" and "d3". Therefore, operator "op2" is applied to "d2" and "d3" and the result has operator "op1" applied to it and "d1".

Graphs have precise semantic meanings, which are programming language dependent and culturally or natural language independent. For example, for a conventional procedural programming language (such as C), the above tree example is normally interpreted as first evaluate leaf node 102, then evaluate node 103, and finally evaluate node 101. However, the semantic meaning itself of a graph is not a concern to the described method, which only requires that the natural language descriptions associated with a particular graph faithfully describe the intended semantic meaning of the graph. The described method constructs such graphs while interacting with users of a user interface using graphical elements with associated natural language descriptions.

A user interface enables the generation of a tree data structure 100 as shown in FIG. 1 formed of nodes 101-105. The nodes are data elements 102, 104, and 105 in the form of parameters/operands or operator elements 101 and 103 which are used to generate a computer program. The operator elements 101 and 103 define the operations/functions carried out on the data elements 102, 104, and 105. Use of a tree data structure 100 enables the computer program operators to be defined in an unambiguous manner without, or with minimal, use of natural language.

Data elements 102, 104, and 105 each have a defined data type 110, 120 and a data value 111, 112, 121. For example, data element "d1" 102 may be of "data type 1" 110 with "value 1" 111, data element "d2" 104 may be of "data type 1" 110 with "value 2" 112, and data element "d3" 105 may be of "data type 2" 120 with "value 1" 121. Each data type 110, 120 has a description 115, 116, 125, 126 which may be available in different natural languages.

Data elements 102, 104, 105 are categorized by type and a description 115, 116, 125, 126 is provided for each individual data type in natural languages. For example, if di is of type T, a description can be prepared of the form: "Type T data {d}".

Operator elements 101 and 103 each have corresponding operators 130 and 140 each of which are provided with a description 135, 136, and 145, 146, respectively, which may also be available in different natural languages. For example: "Operator op1 first performs . . . on {d1} and then performs . . . on {d2}, returning a value of type T."

The descriptions 115, 116, 125, 126, 135, 136, 145, and 146 enable the user to correctly use the data types 110, 120 and operators 130, 140. It is a requirement that such a description is unambiguous in terms of what the data/operator is about.

The descriptions 115, 116, 125, 126, 135, 136, 145, and 146 also enable translations to be easily carried out by converting between descriptions in different natural languages as described further below.

Data types 110, 120 and values 111, 112, 121 are either predefined in the system or are input by a user during the interaction with the user interface. The system predefines a set of operators 130, 140 usable by the user.

Figure 2A:
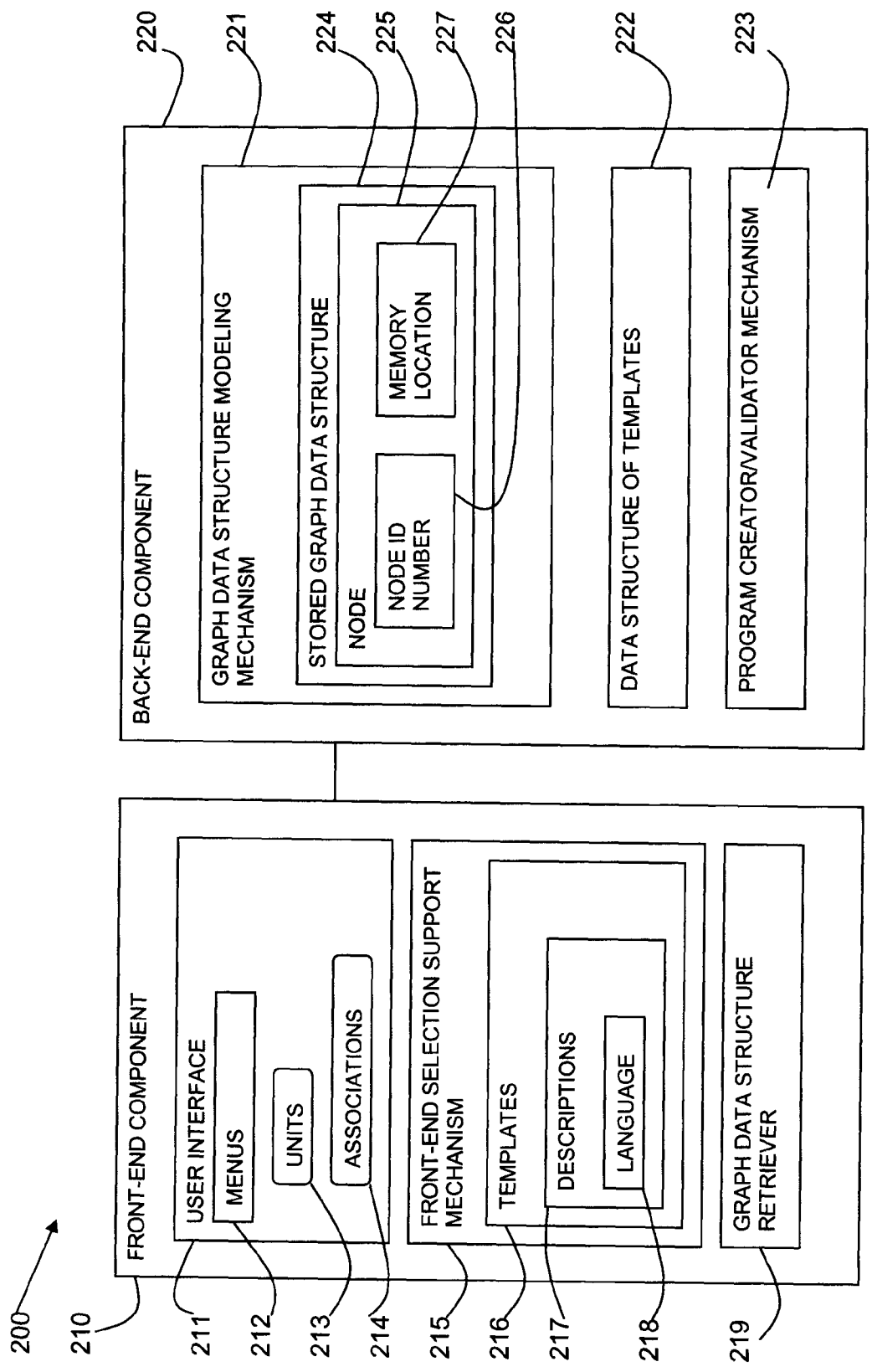
FIG. 2A is a block diagram of a system in accordance with an embodiment of the present invention.

Referring to FIG. 2A, a block diagram shows an embodiment of the described system. The system 200 includes a front-end component 210 including a user interface 211 for user input/output and a front-end selection support mechanism 215. The system 200 also includes a back-end component 220. It should be understood that some or all the supporting functionality described at the front-end component 210 can be moved into the back-end component 220, or vice versa, which are just different ways of implementing the present invention.

The user interface 211 includes menus 212 of templates 216 for defining units 213 in the form of data elements and associations 214 between units 213 defining operators as described in relation to FIG. 1. The front-end selection support mechanism 215 owns templates 216 which have descriptions 217 provided in one or more natural languages 218. The user may select the language 218 via the user interface 211. When a new unit/association 213/214 is created and displayed, a unique back-end graph node identity number is obtained from the back-end component 220 and attached to the displayed entity.

The front-end selection support mechanism 215 includes user functionality to associate 214 the defined units 213 with each other in a graph data structure. Each unit 213 and each association 214 has a description 217. A user can select a language 218 for the description 217 of the units 213 and associations 214.

A back-end component 220 associated with the front-end component 210 includes a graph data structure modeling mechanism 221, a data structure of templates 222 and a program creator/validator 223.

The graph data structure modeling mechanism 221 includes stored graph data structures 224 as created and updated by the user interaction with the user interface 211. The stored graph data structures 224 include node identity numbers 226 which are unique and attached to the user interface display entity. The stored graph data structures 224 include memory locations 225 for pointers to the data structure of templates 222. The data structure of templates 222 is provided in the form of a two-dimensional array defining the templates 216.

A program creator/validator 223 uses the graph data structure modeling mechanism 221 to create or validate a computer program. Apart from memory locations for the usual pointers to its parent and children, each node of a graph data structure 224 holds a memory location for a pointer to an entry of associations 214 or units 213 in the data structure of templates 222. This allows the back-end component 220 to retrieve various items of information about specific associations 214 or units 213 for validation purposes, for example, whether a child is returning the right type of value for a particular parent graph node. At the same time, the identity number 226 of the newly created graph node, which will be unique, is sent to the front-end component 210 to be attached to the new display entity.

The front-end component 210 may also include a graph data structure retriever 219 for retrieving an existing graph data structure 224 from the back-end component 220 for display in any selected natural language 218 on the user interface 211.

Figure 2B:
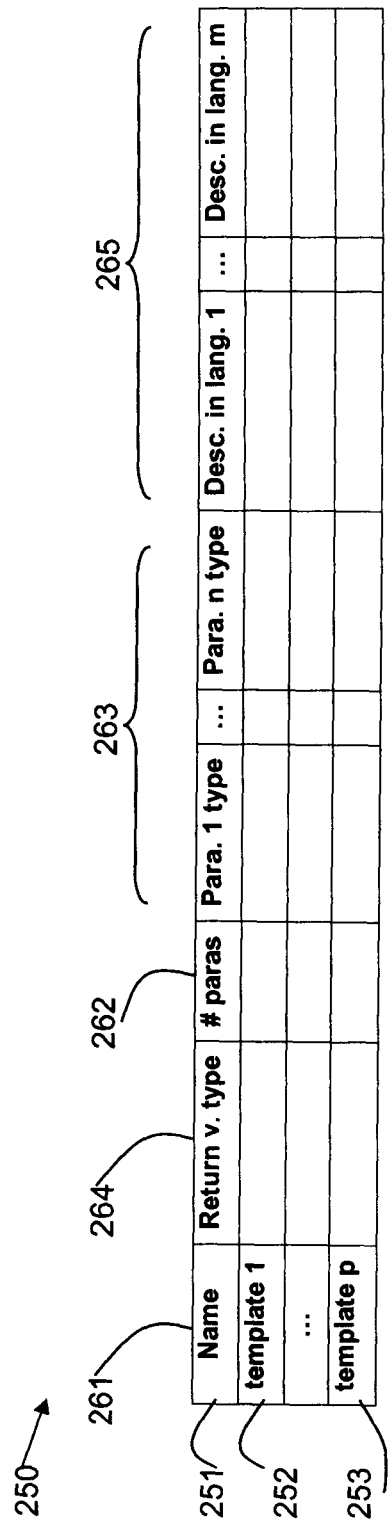
FIG. 2B is an embodiment of a data structure of templates of FIG. 2A.

Referring to FIG. 2B, a table 250 shows a two dimension (2-D) array embodiment of the data structure of templates 222. The data structure of templates 222 is a computer data structure provided internally to store the characteristics of all known operator templates 251, 252, and 253. Each 1-D array for a particular operator 251, 252, or 253 includes: a record of the name of the operator 261, the number of parameters 262, the parameter types 263, type of returned value 264, the operator description in different languages 265, etc. Templates for various types of constants which a user might need to input are treated as operators which just return constant values.

Figure 3:
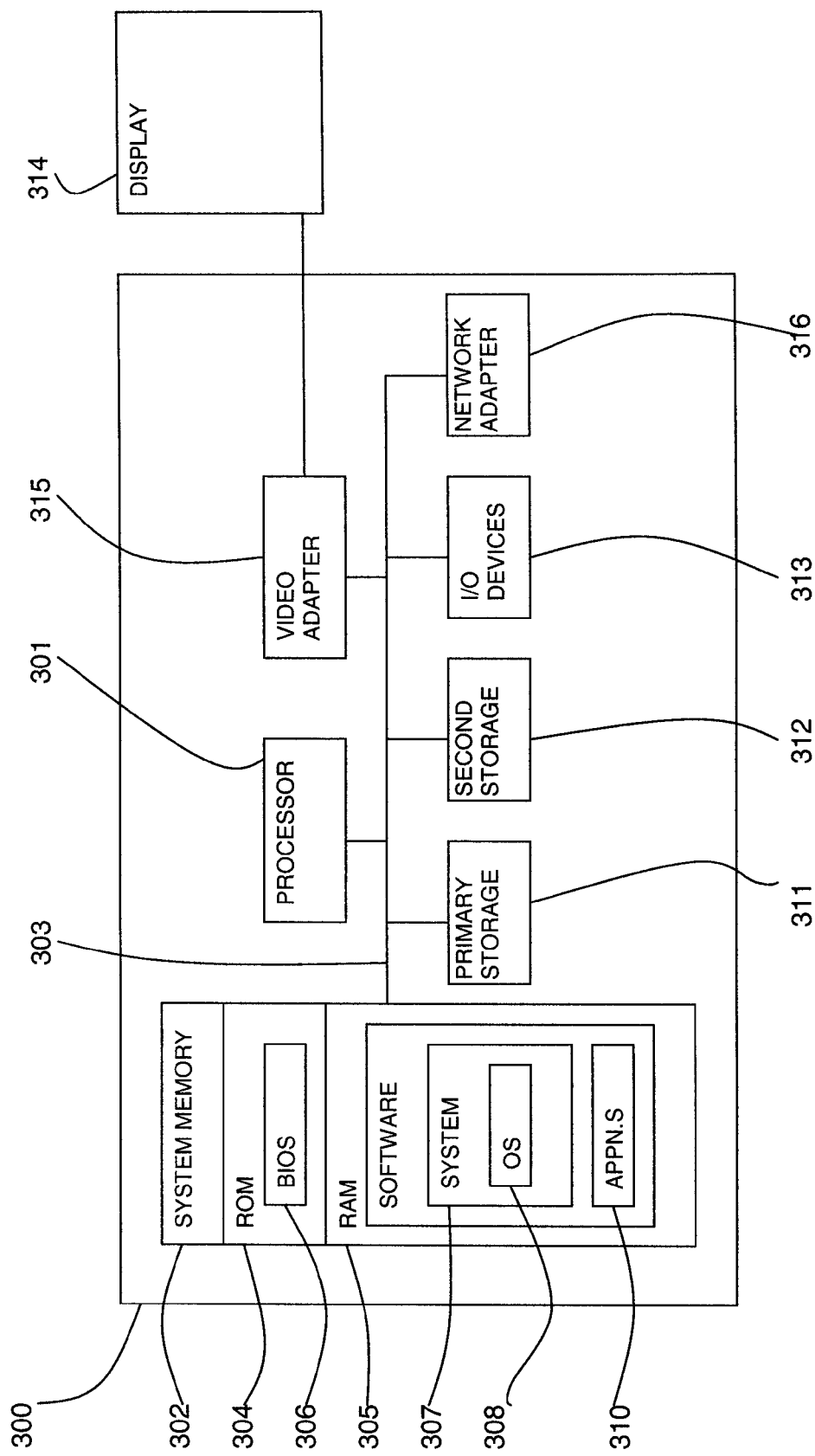
FIG. 3 is a block diagram of a computer system in which an embodiment of the present invention may be implemented.

Referring to FIG. 3, an embodiment of the invention includes a data processing system 300 suitable for storing and/or executing program code including at least one processor 301 coupled directly or indirectly to memory elements through a bus system 303. The memory elements can include local memory employed during actual execution of the program code, bulk storage, and cache memories which provide temporary storage of at least some program code in order to reduce the number of times code must be retrieved from bulk storage during execution.

The memory elements may include system memory 302 in the form of read only memory (ROM) 304 and random access memory (RAM) 305. A basic input/output system (BIOS) 306 may be stored in ROM 304. System software 307 may be stored in RAM 305 including operating system software 308. Software applications 310 may also be stored in RAM 305.

The system 300 may also include primary storage 311, such as a magnetic hard disk drive, and secondary storage 312, such as a magnetic disc drive and/or an optical disc drive. The drives and their associated computer-readable media provide non-volatile storage of computer-executable instructions, data structures, program modules and other data for the system 300. Software applications may be stored on the primary and secondary storage means 311, 312 as well as the system memory 302.

The computing system 300 may operate in a networked environment using logical connections to one or more remote computers via a network adapter 316.

Input/output devices 313 can be coupled to the system either directly or through intervening I/O controllers. A user may enter commands and information into the system 300 through input devices such as a keyboard, pointing device, or other input devices (for example, microphone, joy stick, game pad, or the like). Output devices may include speakers, printers, etc. A display device 314 is also connected to system bus 303 via an interface, such as video adapter 315.

The system represents a program constructed by a user internally as a graph data structure. The operator descriptions stored in the templates are accessible by the user through menus. For each operator selected by the user, the system constructs a new graph node containing the index of the template selected and pointers to its parameter graph nodes. After the user makes a selection, the selected description is displayed on an appropriate area on the screen and the display location is then recorded on the new graph node as well.

Figure 4:
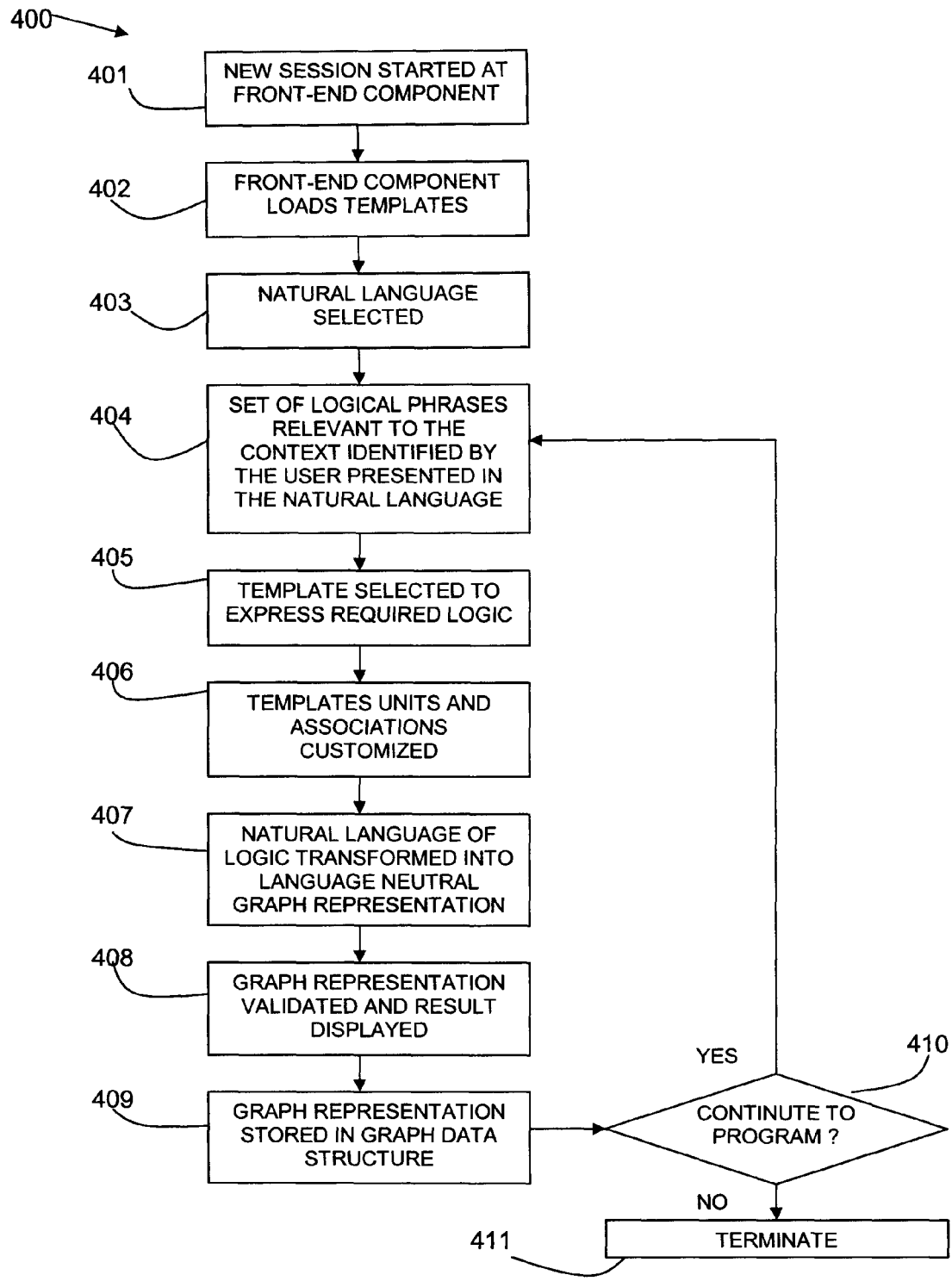
FIG. 4 is a flow diagram of a method in accordance with an embodiment of the present invention.

Referring now to FIG. 4, a flow diagram 400 shows a method of program construction. A new session is started at 401 with user interaction with the front-end component. The front-end component loads its templates from the back-end component at 402. A natural language is selected at 403 for use by the user via menus in the user interface.

A set of logical phrases is presented to the user at 404 in a format close to the natural language selected via menus in the user interface. When a user activates a menu within an existing natural language construct, the menu will present a restricted set of options based on its context within the existing natural language construct. For example, in the case of a menu relating to an operator, those operators compatible with the existing operands will be presented. In the case of a menu relating to an operand, those variables of a compatible type with the existing natural language construct will be presented along with those functions returning this compatible type. A template is selected at 405 via a menu to express the logic the user requires. The template's units and associations are customized 406 via menus to represent the user's requirements.

A unit can be either a value of the defined permitted data types or a further template. For example, in expression "a+b", "a" could be defined as "(x*y)" which is defined using another template.

The natural language expression of the logic is transformed at 407 into a language neutral graph representation using templates. The graph representation of logic is sent at 408 to the back-end component, which validates it, and the validation result is sent back to the user interface to notify the user about the current program status. The graph representation of logic is stored at 409 in the back-end graph data structure.

The method then checks if the user intends to continue at 410. If so, it continues back to step 404. If not, the method ends at 411.

Figure 5:
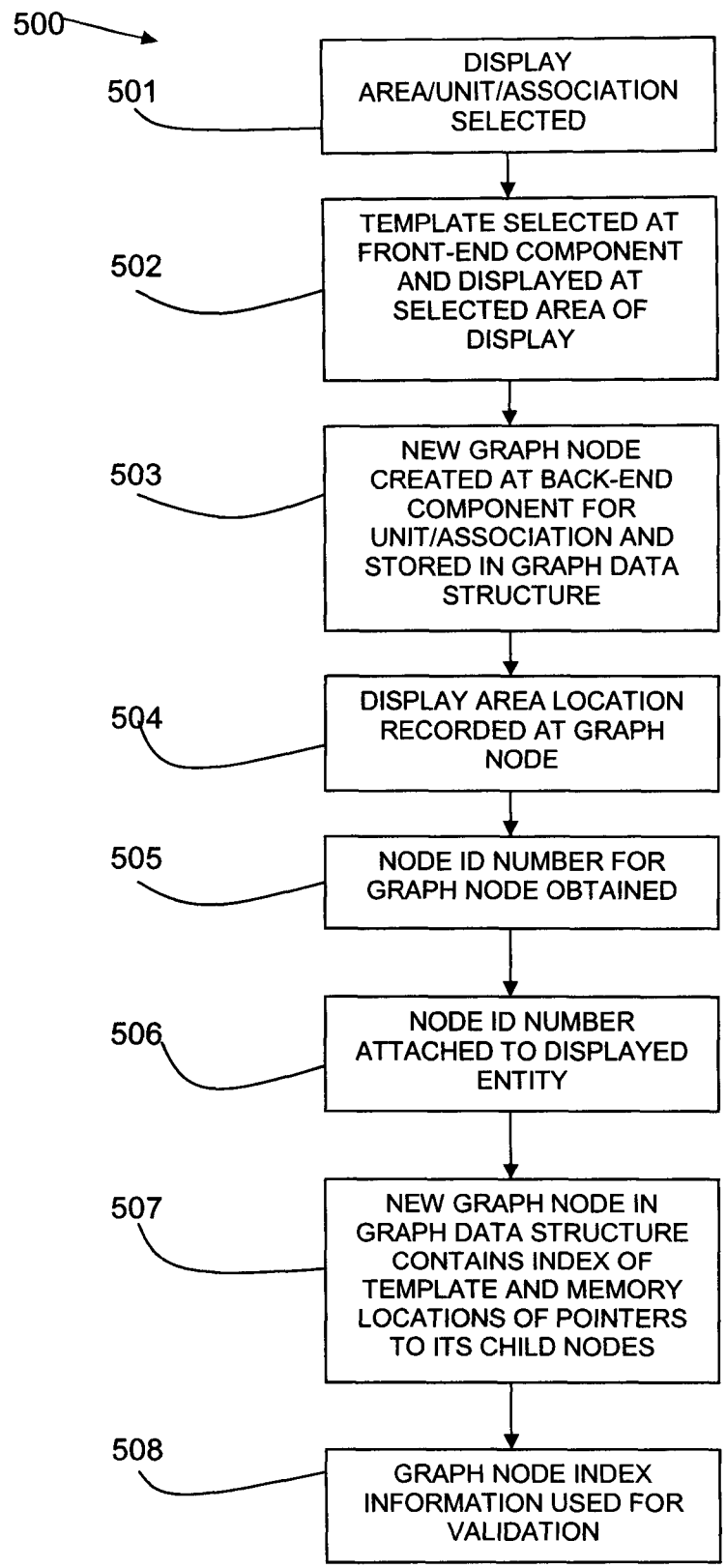
FIG. 5 is a flow diagram of a method in accordance with an embodiment of the present invention.

Referring now to FIG. 5, a flow diagram 500 shows further details of the method of program construction. A display location, exiting unit, or existing association is selected at 501, and a template is selected at 502 on the user interface at a front-end component and displayed at an appropriate area of the display.

A new graph node is created at 503 for the unit/association and stored at the back-end component in a graph data structure. A display area location is recorded at 504 at the graph node. This not only allows the identification of the corresponding display area for each graph node, but also makes the identification of the corresponding graph node of a specific displayed operator description possible.

A node identification number for the new graph node is obtained at 505 from the back-end component and attached at 506 to the displayed entity.

The new graph node in the graph data structure at the back-end component contains 507 an index of the template selected and memory locations of pointers to its child parameter graph nodes.

The graph node index information about a specific unit/association is used at 508 for validation purposes of the logical expression.

Figure 6:
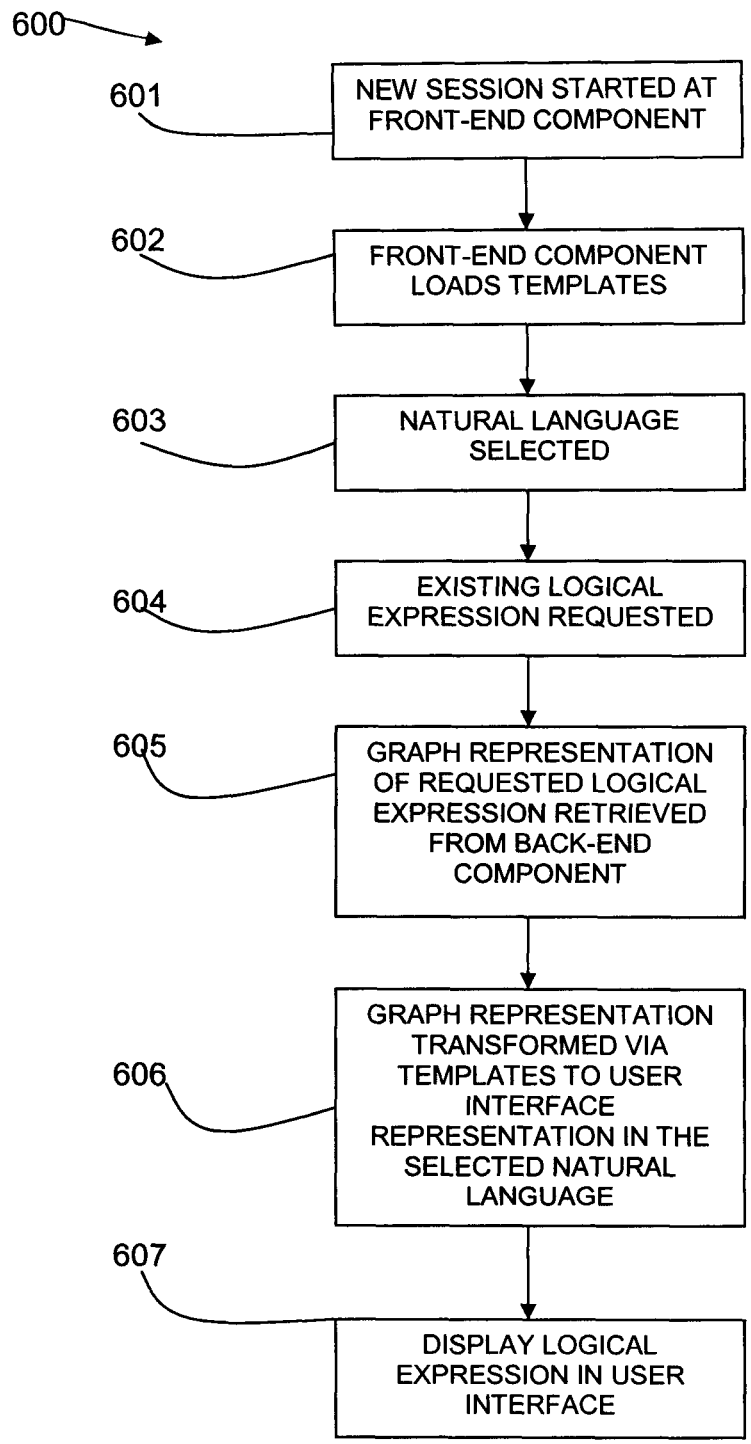
FIG. 6 is a flow diagram of a method in accordance with an embodiment of the present invention.

Referring now to FIG. 6, a flow diagram 600 shows a method of program translation between natural languages. A new session is started at 601 at a front-end component. The front-end component loads templates at 602 from a back-end component store. A natural language is selected at 603, via menus.

An existing logical expression is requested at 604, via menus at the front-end component. The existing logical expression may have been defined in any language and at definition time would have been transformed via templates into a non-language specific graph representation in the back-end component.

The graph representation of the requested logical expression is retrieved at 605 from the back-end component store and transformed at 606 via templates to a user interface representation with the selected natural language and presented in the user interface.

The logical expression is displayed at 607 for viewing by a user in the user interface in a format close to their own language.

The translation of data element and operator descriptions can be performed before a product is released and, on a particular natural language platform, the appropriate translated function descriptions are loaded by the system.

Figure 7B:
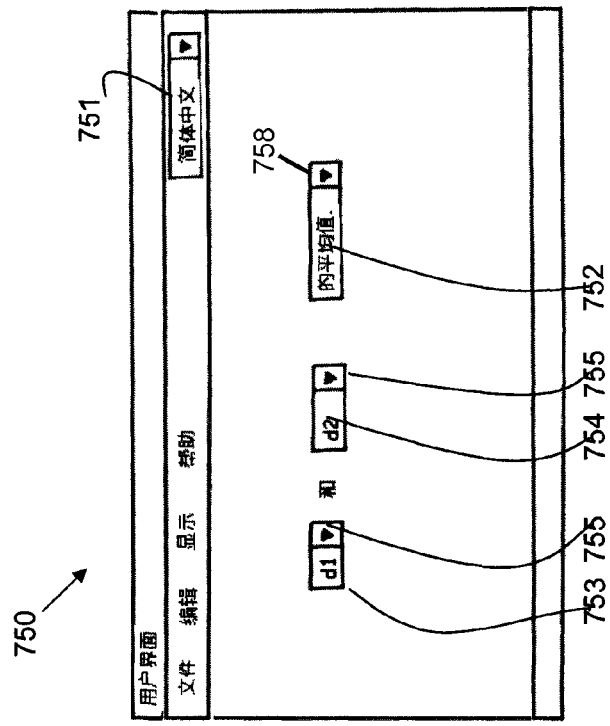
FIGS. 7A and 7B show embodiments of a graphical user interface in accordance with the present invention.
Figure 7A:
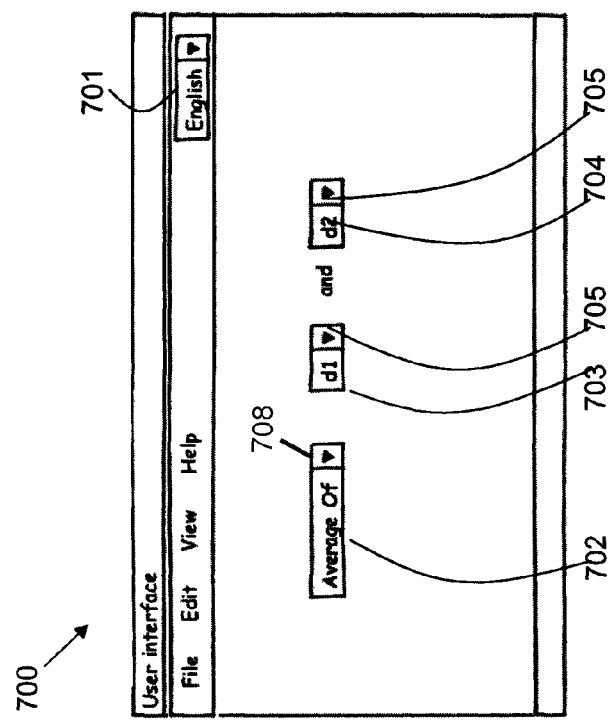

Referring to FIGS. 7A and 7B, example user interface displays 700 and 750 are shown. A first interface 700 is shown in the selected language of English while the second interface 750 is shown in the selected language of simplified Chinese. The user interfaces 700 and 750 have a drop down menu 701 and 751, respectively, for selecting the language of the display.

In the user displays 700 and 750 an operator 702 and 752 are shown with a drop down menu 708 and 758. The operator 702, 752, which has been selected, is an "average of." Two data values in the form of parameters/operands 703, 704, 753, 754 have been selected as "d1" 703, 753 and "d2" 704, 754. Data values also have drop down menus 705, 755 to select the values.

As illustrated in FIGS. 7A and 7B, the user interface display in the selected natural language shows the required function in a format close to the user's natural language.

A user is also allowed to select a subset of an already constructed program and define it as a stand-alone function, and associate a name to the subset. This causes the function to be appended into the data structure of templates 222 and used in the same way as any other predefined templates. This allows the user to reuse a function definition in multiple places and also make recursive description of operations possible.

Typically, a user starts to write a program from an empty display on a user interface. Through user interface interactions, a description of a program is built up, that is close to the user's natural language, by introducing new or combining existing description units in the display.

The user can interact with the user interface by performing any of the following steps in any order. These steps produce a unit on the display, which is treated by the system as a single non-divisible unit when selected later. At the same time, these steps also construct/alter corresponding internal semantic graphs. The internal semantic graphs can be used by the system to validate a program and provide the user with appropriate programming advice if required.

A pull-down menu may be used to define data values, for example, a string, a date, or a numerical number. Such values can be a user defined constant or the value of a known variable. The type of the data defined must be one of the predefined template types for which a translated description is available. As a result, the system constructs an internal graph node to represent the unit.

A pull-down menu may be used to introduce predefined templates of operators described in a selected natural language. The user can choose to mark a subset of already displayed description units (including marking none of them) and then pick up predefined operators. When marked, only those predefined functions that can be applied to the graph nodes corresponding to those marked description units (as operator parameters) will be selectable from the menu. The translated descriptions associated with each selectable operator will be displayed alongside so that the user can see a clear description of what is selectable. The marked description units can be used by an operator in different ways, multiple descriptions are provided, each describing a different usage. Once a particular operator is selected, the description associated with the selected operator will be inserted into the display (at the cursor location), absorbing the marked description units into the operator description (i.e., removing the marked descriptions and using them to replace the corresponding abstract parameters in the original operator description). The system constructs an internal sub-graph by introducing a parent node and attaches the marked parameter nodes as its children.

An existing description unit may be dragged-and-dropped to another location. This mechanism can be used for the following purposes:
   A. Dragging an existing free standing description unit onto an operator's parameter will cause the free standing description unit to be used as the parameter.
   B. Dragging the description unit of an already defined operator parameter to another place (or deleting it) will un-define the parameter.

If a user selects a parameter of an already displayed function, it is interpreted that the marked parameter needs to be changed, and all those templates that return the right type of values for the parameter are presented in a pop-up menu. Once a selection is made, the corresponding graph node of the back-end graph is identified using the graph node identity number attached to the selected entity. The child pointer of the corresponding graph node is modified to point to a newly created graph node representing the parameter selected. The text of the marked parameter is replaced by the description of the newly constructed function (text shifted when necessary).

If a user selection is made while the entire description of an already displayed function is marked, and the function is not already a parameter of another function, it is interpreted as that the user intends to use this identified function as one of the parameter for a new function. Therefore only those functions that take the right type of value as their parameters are displayed. If several parameters of the same function are of the right type, multiple description instances of the function are presented, each highlighting a different parameter. Once a selection is made, a new graph node is constructed and the appropriate parameter pointer in the new graph node is pointed to the graph node corresponding to the marked function. The description of the new function takes the place of the marked description text and the marked description text is used as part of the description for the identified parameter (text shifted when necessary).

If a user selection is made while multiple functions, that are not the parameters of any existing functions, are marked, it is interpreted that the user intends to use these identified functions as the parameters for a new function. All those functions that take the right types of parameters are then presented in a menu. The display order of the marked functions will be respected. The operators carried after a selection is made are similar to those described above.

If a user selection is made while no functions or parameters are marked, all available functions will be presented in a menu. After a selection is made, the function description is displayed at a location that does not break any existing descriptions.

An existing description of a function on the screen, whether or not it is used as a parameter of another function, can be dragged-and-dropped to another location. If the function is already used as a parameter of another existing function, the graph node of the dragged function is disconnected from the parent graph node, leaving the parent node childless. If the new location is associated with a parameter of another existing function, the graph node of the dragged function is attached to the new parent node.

The corresponding structures, materials, acts, and equivalents of all elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A method for constructing a natural language-independent computer program, comprising:

defining, with a processor, at least one data element as a graphical representation in a user interface, wherein said at least one data element has a data type and a value;

associating, with said processor, said at least one data element with an operator in said graphical representation, wherein said operator is defined to perform defined functions on said at least one data element;

wherein said data type and said operator have reference descriptions in a plurality of natural languages; and using appropriate natural language reference descriptions of said data type and said operator to define a natural language-independent computer program.

2. The method of claim 1, further comprising defining a language-independent graph data structure, in order to relate said operator and said at least one data element defined in said user interface to nodes in a graph data structure.

3. The method of claim 2, wherein said data type and said operator are pre-defined in said user interface and are selectable by a user.

4. The method of claim 3, wherein said defined at least one data element comprises a non-divisible unit.

5. The method of claim 4, wherein said operator is defined on said defined at least one data element in the form of a result of a previous operator.

6. The method of claim 5, wherein said graph data structure is used to create or validate a logical expression.

7. The method of claim 6, wherein said graph data structure is used to translate said logical expression between natural languages using said reference descriptions.

8. A system for constructing a natural language-independent computer program, comprising:

a processor; and a memory connected to the processor, wherein the memory is encoded with instructions and wherein the instructions when executed comprise:

instructions for defining at least one data element as a graphical representation in a user interface, wherein said at least one data element has a data type and a value;

instructions for associating said at least one data element with an operator in said graphical representation, wherein said operator is defined to perform defined functions on said at least one data element;

wherein said data type and said operator have reference descriptions in a plurality of natural languages; and instructions for using appropriate natural language reference descriptions of said data type and said operator to define a natural language-independent computer program.

9. The system as claimed in claim 8, further comprising a graph data structure retriever for retrieving a previously defined graph data structure for transformation and display in a user selected natural language on the user interface.

10. The system of claim 9, further comprising a data structure of templates of data types and operators.

11. The system of claim 10, wherein a graph data structure modeling mechanism includes a store of graph data structures with at least one graph node for a defined data element or operator, wherein said at least one graph node includes a record of a display location of a displayed data element or operator in said graphical representation.

12. The system of claim 11, wherein said graph data structure modeling mechanism includes a store of graph data structures with said at least one graph node for a defined data element or operator, further comprises an identification number to be attached to said displayed data element or said operator in said graphical representation.

13. The system of claim 12, wherein said graph data structure modeling mechanism includes a store of graph data structures with at least one graph node for a defined data element or operator, wherein said at least one graph node includes a record of a template selected and memory locations of pointers to a template parameter for validating a logical expression.

14. A computer program product for constructing a natural language-independent computer program, the computer program product comprising a computer readable storage apparatus having computer readable program code embodied therewith, the computer readable program code comprising:

computer readable program code configured to define at least one data element as a graphical representation in a user interface, wherein said at least one data element has a data type and a value;

computer readable program code configured to associate said at least one data element with an operator in said graphical representation, wherein said operator is defined to perform defined functions on said at least one data element;

wherein said data type and said operator have reference descriptions in a plurality of natural languages; and computer readable program code configured to define a natural language-independent graph data structure to represent a computer program using appropriate natural language reference descriptions of said data type and said operator.

15. The computer program product of claim 14, wherein said defined natural language-independent graph data structure relates said operator and said at least one data element defined in said user interface to nodes in said graph data structure.

16. The computer program product of claim 15, wherein said data type and said operator are pre-defined in said user interface and are selectable by a user.

17. The computer program product of claim 16, wherein said at least one data element comprises a non-divisible unit.

18. The computer program product of claim 17, wherein said operator is defined to perform defined functions on said at least one data element defines said operator in the form of a result of a previous operator.

* * * * *